UNITED STATES PATENT OFFICE.

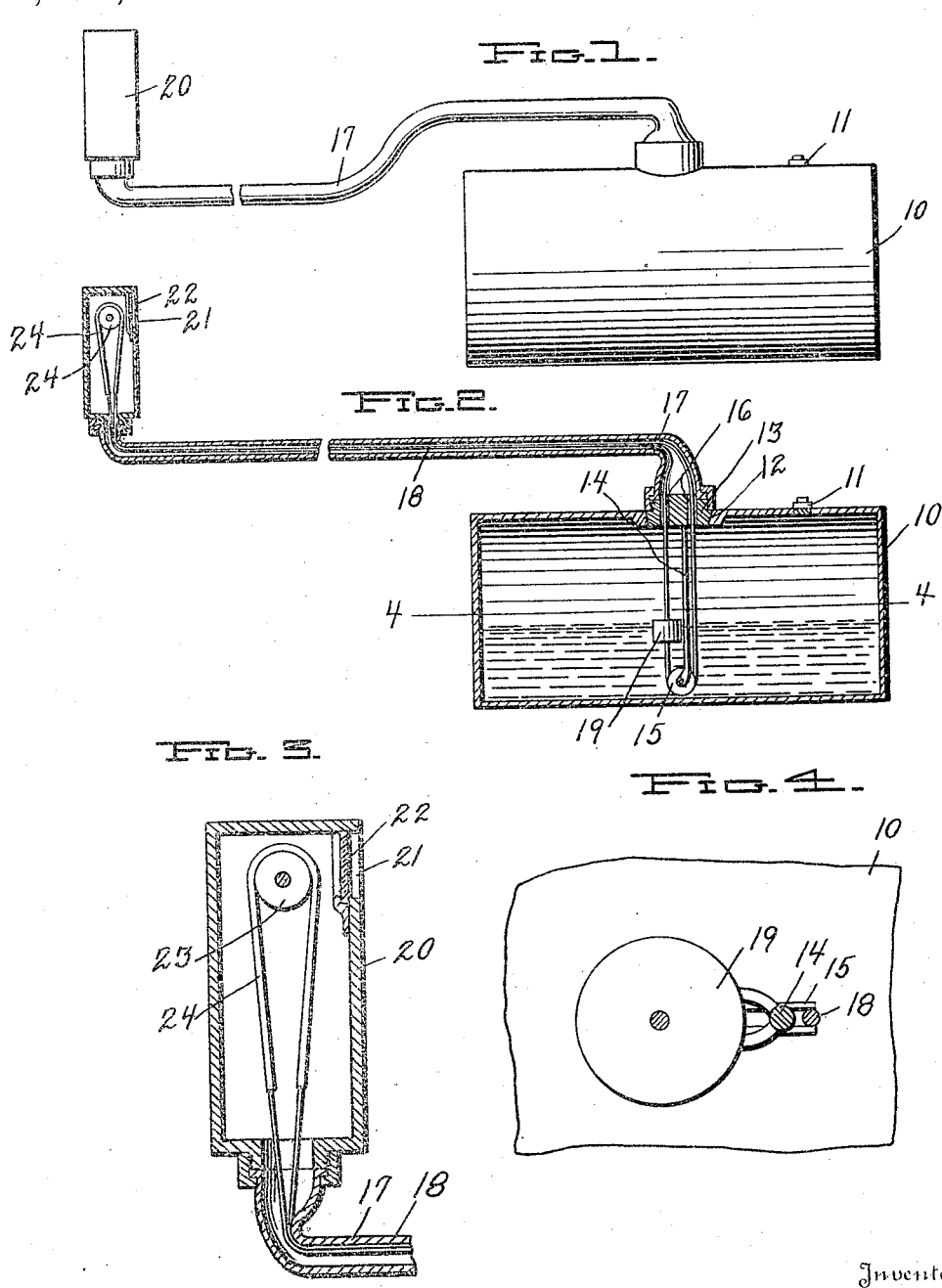

JOHN M. HUNTER, OF SANFORD, FLORIDA.

LIQUID-GAGE.

1,174,579.  Specification of Letters Patent.  Patented Mar. 7, 1916.

Application filed April 5, 1915.  Serial No. 19,305.

*To all whom it may concern:*

Be it known that I, JOHN M. HUNTER, a citizen of the United States, residing at Sanford, in the county of Seminole, State of Florida, have invented certain new and useful Improvements in Liquid-Gages; and I do hereby declare the following to be a full, clear, and exact description of the invention, such as will enable others skilled in the art to which it appertains to make and use the same.

This invention relates to improvements in liquid measuring devices.

The principal object of the invention is to provide a simple and novel device for accurately indicating the liquid contents of a receptacle and at the same time the amount of liquid drawn therefrom.

Another object is to provide a simple device of this character which can be readily inserted within the ordinary receptacle, for instance an oil or gasolene tank so that accurate registration of the amount of liquid drawn from the receptacle can be seen at all times.

Other objects and advantages will be apparent from the following description when taken in connection with the accompanying drawing.

In the drawing: Figure 1 is an elevation of a tank having my invention applied thereto, Fig. 2 is a longitudinal sectional view through the tank, Fig. 3 is an enlarged vertical sectional view through the indicating device, and Fig. 4 is a horizontal sectional view on the line 4—4 of Fig. 2.

Referring particularly to the accompanying drawing, 10 represents a suitable tank having a filling opening 11. A second opening 12 is formed in the tube of the tank and in this opening is secured a suitable plug 13. Carried by this plug and extending down into the contents of the tank is a rod 14 the lower end of which carries a grooved pulley 15. The plug is also formed with two openings 16, and secured to the upper side of the plug and covering the openings is a pipe 17. Passed through the pipe and through the openings of the plug is a cord or wire 18, the intermediate portion of which passes around the pulley 15. One portion of the cord within the tank has secured thereto a suitable float 19 which rests on the surface of the line and is arranged to rise and fall with the line. To the other end of the pipe is connected a casing 20, in one side of which is a sight opening 21 provided with a suitable glass plate 22. Mounted in this casing is a band pulley 23 over which is passed a band or tape 24. The ends of the band or tape are secured respectively to the ends of the cord or wire 18, and on the outer surface of the band are printed or otherwise formed graduations in liquid measure. It will be noted that the band pulley 23 is so disposed that the readings on the band or tape can be seen through the sight opening 21.

While I have not shown any particular application of the device, I wish it understood that the same can be used on automobiles, motorcycles or other places where liquid containers are used.

When the container is full, the float 19 will be on the surface of the liquid at the top of the tank but when the level of the liquid falls through drawing an amount of liquid from the container, the float will fall with the liquid. This falling of the float will pull on the cord and draw one end of the cord 18 downward so that the other portion will move upwardly, as in like manner will the other portion of the cord. The markings on the tape are so arranged that the distance which the float drops will equal a certain amount of liquid drawn from the container, thereby presenting said marking of the tape to view through the sight opening 21.

What is claimed is:

The combination with a liquid containing tank, of a removable plug disposed in the upper portion of the tank and having a pair of vertical openings therethrough, a depending rod carried by the plug and having a grooved pulley in the lower end, an indicator including a drum having a marked tape passed thereover, a conduit connecting the indicator casing with the plug, a cord having its ends attached to the ends of the tape and passing through the conduit with its intermediate portion engaged around the grooved pulley, and a float rigidly connected to the portion of the cord between the plug and the pulley.

In testimony whereof, I affix my signature, in the presence of two witnesses.

JOHN M. HUNTER.

Witnesses:
 DOUGLASS R. ELLERBE,
 R. C. MAXWELL.